March 15, 1938. M. W. FISH 2,111,283
LIQUID LEVEL GAUGE
Filed July 31, 1934

Inventor
MORTIMER W. FISH

Patented Mar. 15, 1938

2,111,283

UNITED STATES PATENT OFFICE 2,111,283

LIQUID LEVEL GAUGE

Mortimer W. Fish, Dayton, Ohio, assignor to General Motors Corporation, Dayton, Ohio, a corporation of Delaware Application July 31, 1934, Serial No. 737,784

4 Claims. (Cl. 73—317)

This invention relates to refrigerating apparatus and more particularly to liquid refrigerant receivers and to the provision in such a receiver of means for indicating the level of liquid refrigerant therein. In a refrigerating apparatus of the compressor-condenser expander type, it is necessary on occasion to perform certain service operations thereon and it is frequently of great assistance in servicing such refrigerators to be able to determine the level of liquid refrigerant in the receiver in order to ascertain the conditions existing within the refrigerant circuit as well as to assist in determining the amount of refrigerant charge in the system.

It is necessary in the present type of refrigerating apparatus to avoid as far as possible the use of joints in the system which cannot be hermetically sealed inasmuch as the problem of sealing an aperture in a wall against the passage of refrigerant while permitting motion of a member passing through the aperture presents certain difficulties as well as creates the ever present possibility of leakage of refrigerant. It is therefore desirable in constructing such a refrigerating apparatus to provide mechanism which permits permanent hermetic sealing of the necessary mechanical joints as far as possible.

It is an object of the present invention, therefore, to provide in a liquid refrigerant receiver means for indicating at any time the level of liquid refrigerant therein and which avoids the use of joints which cannot be hermetically sealed.

It is also an object to provide means for indicating the level of liquid refrigerant in a receiver in which the position of a liquid level responsive member inside the receiver may be determined by an indicating member outside the receiver and having no mechanical connection therewith.

It is also an object to provide a liquid refrigerant receiver with means therein adapted to cooperate with a portable indicating instrument which may be brought into cooperation therewith by a person servicing the apparatus and which avoids the necessity of providing a complete indicating instrument permanently built into the refrigerating apparatus.

Further objects and advantages of the present invention will be apparent from the following description, reference being had to the accompanying drawing, wherein a preferred form of the present invention is clearly shown.

Figure 1:
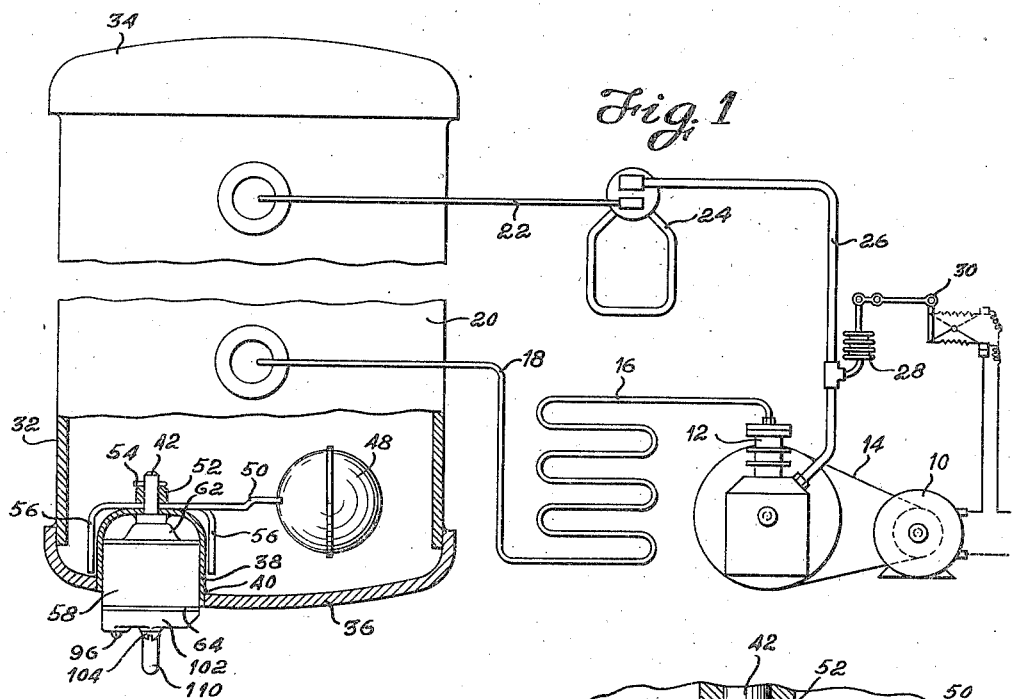
Fig. 1 is a diagrammatic view of a refrigerating apparatus embodying the present invention, a portion of the receiver thereof being shown in cross section and on a larger scale.
Figure 2:
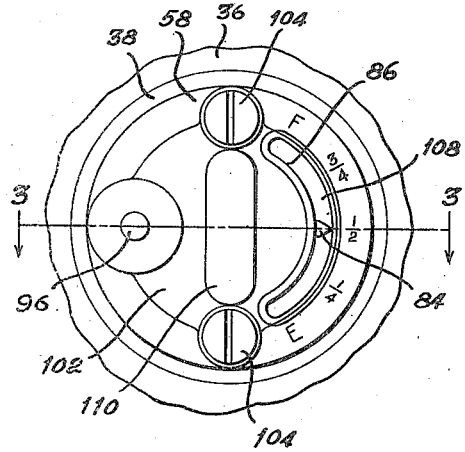
Fig. 2 is an end view of an indicating mechanism provided by the present invention.
Figure 3:
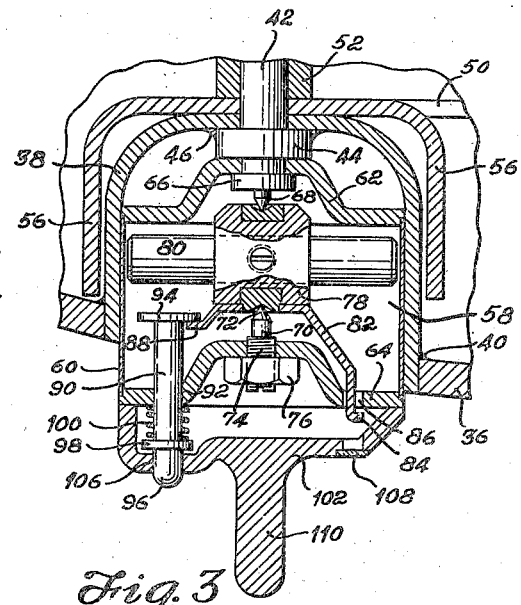
Fig. 3 is a cross section taken on line 3—3 of Fig. 2.

Referring to Fig. 1, there is shown diagrammatically a refrigerating apparatus comprising a motor 10 adapted to drive a compressor 12 by a belt drive 14. The compressor 12 is adapted to compress gaseous refrigerant into a condenser 16 wherein the refrigerant is liquefied and transferred by conduit 18 to the liquid refrigerant receiver 20. Liquid refrigerant is transferred from the receiver 20 by a conduit 22 to an evaporator 24 where the expansion of liquid refrigerant may be controlled in the usual manner by a float valve (not shown) and whence gaseous refrigerant is withdrawn through a conduit 26 to the inlet of the compressor 12. A bellows 28 is in communication with the conduit 26 to control a switch 30 for intermittently operating the motor 10 in accordance with pressures existing in the conduit 26 to maintain a substantially constant temperature in the evaporator 24.

The receiver 20 may be formed of a cylindrical wall 32 having cup-shaped end closures 34 and 36. The closure 36 is provided with an inwardly extending, outwardly facing cup-shaped member 38 which is formed of non-magnetic material and secured to the closure 36 and hermetically sealed thereto as by welding at 40. A pivot member 42 having a head 44 is located in an aperture at the bottom of the cup member 38 and welded thereto as at 46. A float member 48 is mounted for pivotal movement by means of an arm 50 secured to a hub 52 which is retained on the pivot 42 by a pin 54. The arm 50 is provided with a pair of arms 56 of magnetic material which together form a U-shaped member embracing cup-shaped member 38 and rigidly secured to the arm 50. Preferably the arms 56 may be formed as integral parts of the arm 50 by a stamping operation.

The mechanism thus far described may be permanently provided in a refrigerating apparatus and is adapted to cooperate with a suitable indicating instrument generally designated as 58 which may be inserted into the cup 38 whenever it is desired to determine the level of the liquid refrigerant in the receiver 20. If desired, however, the indicating instrument 58 may be permanently located in the cup member 38.

The indicator 58 preferably comprises a sleeve or cylinder 60 of non-magnetic material to which is secured a pair of end plates 62 and 64. The end plate 62 carries a fixed pivot member 66 having a pivot point 68 while the end plate 64 carries a pivot member 70 having a pivot point 72. The member 70 may be adjustable as shown by means of the threaded portion 74 and a lock nut 76. A hub member 78 is pivoted between the points 68 and 72 and carries a transverse bar 80 of magnetic material positioned to extend between the gap formed by the U-shaped arms 56. The hub member 78 also carries at its forward end a combined indicating and locking member 82 having an indicating extension 84 extending through an arcuate slot 86 in the end plate 64 and also having a locking flange 88. A spring pressed locking member 90 is guided in an aperture 92 in the end plate 64 and carries at its inner end a flange 94 adapted to coact with the locking flange 88. The outer end of the locking member 90 forms a push button 96 inwardly of which there is provided a flange 98 between which and the plate 64 is located a light spring 100 for normally retaining the flange 94 in engagement with the flange 88. A combined cover plate and handle member 102 is secured to the outer surface of the plate 64 by bolts 104 and is provided with an aperture 106 through which the locking member 90 extends. A window 108 is provided and is of such shape that the indicator 84 may be observed therethrough. A semi-cylindrical protuberance 110 is formed integrally with the cover 102 to provide a grip or handle member by which the indicating instrument may be bodily inserted in and removed from the cup-shaped member 38.

In operation the float 48 is adapted to follow the variations in the level of liquid refrigerant inside the receiver 20 and in its pivotal movements about the pivot 42 carries with it the arms 56 which move around the circumference of the cup shaped member 38. Either the bar 80 or the arms 56 or both may be permanently magnetized and inasmuch as the cup-shaped member 38 and the remaining parts of the indicator 58 are formed of non-magnetic material, the magnetic flux induced by the permanently magnetized member or members may be transmitted through the cup 38 and the sleeve 60. It will therefore be seen with the locking member 90 removed from the flange 88 that the bar 80 will take up its position parallel to the median plane of the U-shaped member formed by the arms 56 and will therefore follow the movements of the arms 56 about the periphery of the cup 38 and thus through the medium of the indicator 84 provide a relative accurate indication of the level of liquid refrigerant in the receiver 20. Indicia may be provided on the cover member 102 to indicate the amount of liquid refrigerant in the receiver corresponding to various positions of the indicator 84.

It will thus be seen that there has been provided a simple and reliable indicator for determining the level of liquid refrigerant in a receiver which avoids the use of movable joints in the refrigerant circuit and which may be either entirely constructed as a permanent part of the refrigerating apparatus or which may have only the mechanism inside the receiver constructed as a permanent part thereof and which may be utilized to indicate the level of liquid refrigerant by inserting temporarily the compact remainder of the indicating instrument.

While the form of embodiment of the invention as herein disclosed, constitutes a preferred form, it is to be understood that other forms might be adopted, all coming within the scope of the claims which follow.

What is claimed is as follows:

1. A liquid level indicating device adapted to indicate the level of liquid in a container and comprising a casing of non-magnetic material, a magnetic member rotatably movable about the casing by changes in level of liquid in the container, a hub pivotally mounted in the casing, a second magnetic member secured to said hub and adapted to rotate said hub in accordance with the rotatable movements of the first mentioned member, one of said magnetic members being permanently magnetized, an indicator carried by said hub and rotatable therewith, and locking means for preventing rotatable movement of said hub and indicator, said locking means including a locking flange associated with said hub for movement therewith and means carried by said casing and normally urged into engagement with said locking flange.

2. A liquid level indicating device adapted to indicate the level of liquid in a container and comprising a casing, a hub pivotally mounted in said casing, magnetic means secured to said hub and operable in response to changes in level of liquid in said container, an indicator carried by said hub and movable in accordance with movements of said magnetic means, and locking means including a locking flange associated with said hub for movement therewith and operative means carried by said casing for engaging said locking flange to prevent movement of said indicator.

3. A liquid level indicating device adapted to indicate the level of liquid in a container and comprising a casing, a hub pivotally mounted in said casing, magnetic means secured to said hub and operable in response to changes in level of liquid in said container, an indicator carried by said hub and movable in accordance with movements of said magnetic means, and locking means including a locking element carried by said hub for movement therewith, a plunger carried by said casing, and means normally holding said plunger in engagement with said locking element.

4. A liquid level indicating device adapted to indicate the level of liquid in a container and comprising a casing, magnetic means movably mounted in said casing and operable in response to changes in level of liquid in said container, an indicator secured to said magnetic means and movable therewith, and locking means for normally preventing movement of said indicator, said locking means including a flanged locking member secured to said indicator for movement therewith, a locking member carried by said casing, and means normally urging one of said locking members into engagement with the other.

MORTIMER W. FISH.